US005725633A

United States Patent [19]

Ozcayir et al.

[11] Patent Number: 5,725,633
[45] Date of Patent: Mar. 10, 1998

[54] SULFONATED POLYIMIDE GAS SEPARATION MEMBRANES

[75] Inventors: Yurdagul F. Ozcayir, Nashua, N.H.; Gertrud Goetz; Benjamin Bikson, both of Brookline, Mass.

[73] Assignee: Praxair Technology, Inc., Danbury, Conn.

[21] Appl. No.: 656,953

[22] Filed: Jun. 6, 1996

Related U.S. Application Data

[63] Continuation-in-part of Ser. No. 497,655, Jun. 30, 1995, Pat. No. 5,618,334.

[51] Int. Cl.$^6$ .......................... B01D 53/22; B01D 71/64; B01D 71/68
[52] U.S. Cl. .......................... 95/45; 95/51; 95/53; 95/54; 96/13; 96/14
[58] Field of Search ............. 96/4, 13, 14; 210/500.39, 210/500.41; 95/45, 49, 51, 53, 54

[56] References Cited

U.S. PATENT DOCUMENTS

| | | | |
|---|---|---|---|
| 3,899,309 | 8/1975 | Hoehn et al. | 29/16 |
| 4,440,643 | 4/1984 | Makino et al. | 96/13 X |
| 4,461,847 | 7/1984 | Hudecek et al. | 96/4 X |
| 4,574,144 | 3/1986 | Yates et al. | 525/435 |
| 4,705,540 | 11/1987 | Hayes | 96/4 X |
| 4,717,393 | 1/1988 | Hayes | 96/4 X |
| 4,717,394 | 1/1988 | Hayes | 96/4 X |
| 4,838,900 | 6/1989 | Hayes | 96/4 X |
| 4,897,092 | 1/1990 | Burgoyne, Jr. et al. | 96/4 X |
| 4,981,497 | 1/1991 | Hayes | 95/51 |
| 5,015,268 | 5/1991 | Ho | 96/14 X |
| 5,034,024 | 7/1991 | Hayes | 95/54 |
| 5,042,992 | 8/1991 | Blinka et al. | 95/51 |
| 5,042,993 | 8/1991 | Meier et al. | 96/14 X |
| 5,055,166 | 10/1991 | Kohn et al. | 95/51 X |
| 5,071,448 | 12/1991 | Bikson et al. | 96/14 X |
| 5,071,452 | 12/1991 | Avrillon et al. | 95/51 X |
| 5,074,891 | 12/1991 | Kohn et al. | 96/14 X |
| 5,076,816 | 12/1991 | Avrillon et al. | 95/51 |
| 5,076,817 | 12/1991 | Hayes | 95/51 X |
| 5,165,963 | 11/1992 | Matsumoto et al. | 95/51 X |
| 5,178,650 | 1/1993 | Hayes | 95/51 X |
| 5,178,940 | 1/1993 | Matsumoto et al. | 96/14 X |
| 5,198,119 | 3/1993 | Berger et al. | 210/500.39 X |
| 5,232,472 | 8/1993 | Simmons et al. | 96/14 |
| 5,234,471 | 8/1993 | Weinberg | 95/51 X |
| 5,248,319 | 9/1993 | Ekiner et al. | 96/14 X |
| 5,262,056 | 11/1993 | Koros et al. | 210/500.39 X |
| 5,266,100 | 11/1993 | Simmons | 96/14 X |
| 5,286,280 | 2/1994 | Chiou | 95/51 X |
| 5,286,539 | 2/1994 | Kusuki et al. | 96/13 X |
| 5,322,549 | 6/1994 | Hayes | 96/4 X |
| 5,334,697 | 8/1994 | Simmons | 96/14 X |
| 5,364,454 | 11/1994 | Bikson et al. | 96/13 X |
| 5,391,219 | 2/1995 | Matsumoto et al. | 95/51 |
| 5,401,410 | 3/1995 | Bell et al. | 210/500.39 X |
| 5,409,525 | 4/1995 | Kazama et al. | 96/14 |
| 5,443,728 | 8/1995 | Macheras et al. | 210/500.39 X |
| 5,490,931 | 2/1996 | Chung et al. | 210/500.39 X |
| 5,591,250 | 1/1997 | Stern et al. | 95/51 |

FOREIGN PATENT DOCUMENTS

| | | | |
|---|---|---|---|
| 0179474 | 4/1986 | European Pat. Off. | 96/14 |
| 57-159505 | 10/1982 | Japan | 96/14 |
| 58-037024 | 3/1983 | Japan | 96/13 |

OTHER PUBLICATIONS

E. Gilbert, Sulfonation and Related Reactions; 1977, pp. 1–121.

H. Cerfontain, Mechanistic Aspects in Aromatic Sulfonation and Desulfonation; 1968, Ch. 1–4, 6, 7 and 9.

Yu.E. Kirsch et al., *Journal of Membrane Science* 103, 95–103; (1995).

Synthesis and Properties of Sulphonated Polypyromellitimides—Vasil,eva, et al., Polymer Science, USSR, pp. 160–168 (Received 26 Jun. 1970).

*Primary Examiner*—Robert Spitzer
*Attorney, Agent, or Firm*—Robert J. Follett

[57] ABSTRACT

Novel polyimide gas separation membranes and the process of using such membranes to separate gases are disclosed. The polyimides are formed from rigid aromatic dianhydrides and aromatic diamines that contain sulfonic acid, salified sulfonic acid, or sulfonic ester groups. Methods of preparing improved composite gas separation membranes from the sulfonated polyimides of this invention are disclosed.

21 Claims, No Drawings

SULFONATED POLYIMIDE GAS SEPARATION MEMBRANES

This is a Continuation-in-Part of prior U.S. application Ser. No. 08/497,655 filing Date: Jun. 30, 1995, now U.S. Pat. No. 5,618,334.

FIELD OF THE INVENTION

This invention relates to the preparation of sulfonated polyimide polymers and their use as gas and vapor separation membranes.

DESCRIPTION OF PRIOR ART

Polyimides with a rigid chain backbone structure, strong chain-chain interactions, and high glass transition temperatures have been reported to exhibit good gas separation and permeation characteristics in gas separation applications. U.S. Pat. Nos. 4,705,540; 4,717,393; 4,717,394; 5,042,993; and 5,074,891 disclose such aromatic polyimide gas separation membranes. Polyimides are generally soluble in aprotic solvents such as N,N-dimethylacetamide and N-methylpyrrolidone. Some polyimides are further soluble in dichloromethane and m-cresol. Their solubility characteristics make polyimides suitable for preparation of asymmetric gas separation membranes but less suitable for preparation of composite gas separation membranes, the latter frequently requiring mild, highly volatile, e.g., low boiling temperature solvents.

A number of modified polyimide polymers have been also disclosed in the art. U.S. Pat. Nos. 4,705,540 and 4,717,394 disclose structurally rigid polyimides having alkyl substituents at all positions ortho to amine functions that form membranes with good gas separation characteristics. U.S. Pat. No. 5,042,993 discloses surface-modified polyimide membranes that exhibit high gas separation factors. The preparation of modified polyimides that contain carboxyl groups is described in U.S. Pat. No. 5,076,816.

The preparation of sulfonated polyimides is reported in U.S. Pat. No. 4,574,144. There was no mention therein of the utility of these materials as separation membranes. The preparation of sulfonated polyimides from sulfonated diamines and pyromellitic dianhydride was further reported by I.V. Vasil'eva et al. in Vysokomol. Soyed., A14, No. 1, 143–149 (1972). The polymers were not soluble in mild solvents such as simple alcohols and were not evaluated for membrane applications. In U.S. Pat. No. 5,409,525 a hydrous gel membrane containing a bulky fluorene unit was disclosed for gas separation. The gel membrane was particularly useful for separation of $CO_2/CH_4$ mixtures.

Thus there remains a need in the field to prepare polyimides with improved separation/permeation characteristics and improved solubility.

It is an object of this invention, therefore, to prepare modified polyimides that have broad solubility characteristics including solubility in mild low-boiling temperature solvent systems that are most useful in the preparation of composite membranes. It is another objective of this invention to prepare modified polyimides with improved gas permeation and separation characteristics.

The sulfonated polyimides of this invention are particularly useful for the preparation of asymmetric and composite gas separation membranes. For example, these membranes can be utilized in hydrogen recovery from hydrogen-containing refinery gas streams, $CO_2$ and $H_2S$ separations from acid gas containing streams such as natural gas sweetening, air separation applications, and gas drying, etc.

With these and other objects in mind, the invention is hereinafter described in detail, the novel features thereof being particularly pointed out in the appended claims.

SUMMARY OF THE INVENTION

Sulfonated polyimide polymers of this invention exhibit improved solubility characteristics, are good film-forming materials and exhibit improved gas separation characteristics. The sulfonated polyimides are particularly useful for preparation of asymmetric and composite gas separation membranes.

DETAILED DESCRIPTION OF THE INVENTION

The present invention relates to the preparation of gas separation membranes from sulfonated polyimides of the following general formula:

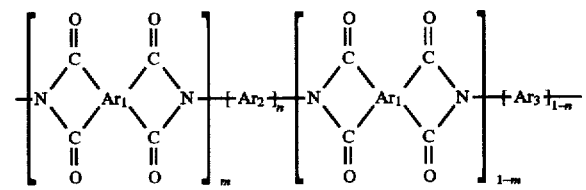

where m can range from 0 to 1.0, preferably from 0.5 to 1.0, and n can range from 0.01 to 1.0, preferably from 0.1 to 0.7.

$Ar_1$, $Ar_2$ and $Ar_3$ are essentially completely aromatic radicals and $Ar_2$ contains sulfonic acid radicals. An aromatic radical will be understood to comprise an organic radical containing at least one aromatic ring. The sulfonic acid radical is defined as sulfonic acid groups —$SO_3H$, salified sulfonic acid group, —$SO_3M$, or sulfonic acid ester group —$SO_2OR_2$. M is an organic base, a primary, secondary, tertiary, quaternary ammonium ion, an alkali ion such as $K^+$, $Na^+$ or $Li^+$, preferably $Li^+$, alkaline earth or transitional metal ion. $R_2$ is an alkyl radical with less than 6 carbon atoms, preferably methyl or ethyl, or an aryl radical.

In the preferred embodiments, $Ar_1$ is an aromatic dianhydride radical represented by the following structures:

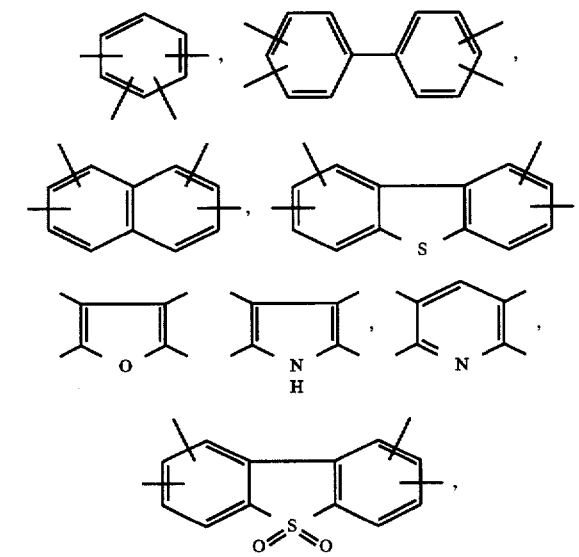

-continued

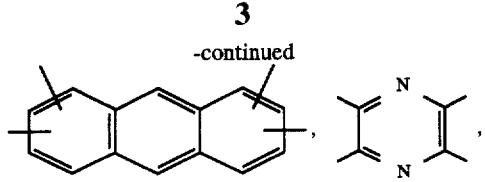

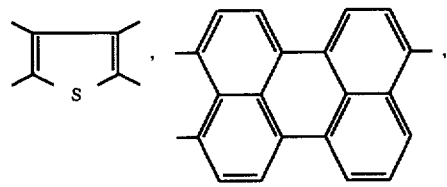

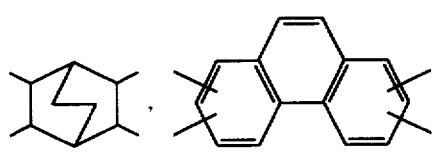

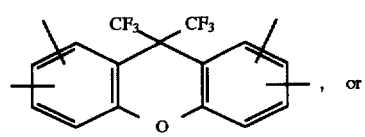

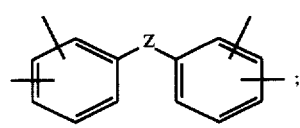

Z is $-\overset{CF_3}{\underset{CF_3}{C}}-$, $-\overset{CH_3}{\underset{CH_3}{C}}-$, $-CH_2-$, $-CHOH-$, $-\overset{O}{\underset{O}{S}}-$, $-O-$, $-S-$, $-\overset{O}{C}-$, $-\overset{R_3}{\underset{R_3}{Si}}-$, $+\overset{R_3}{\underset{R_3}{Si}}-O-\overset{R_3}{\underset{R_3}{Si}}\overleftrightarrow{\jmath}$,

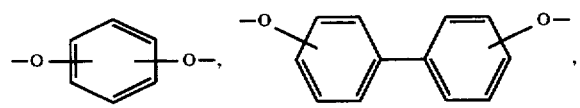

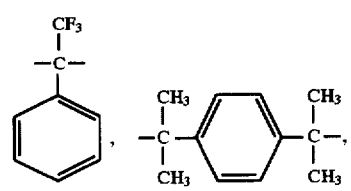

-continued

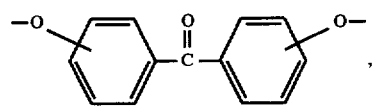

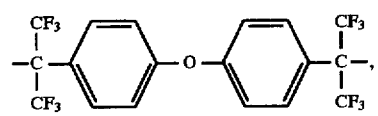

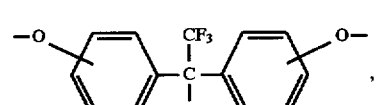

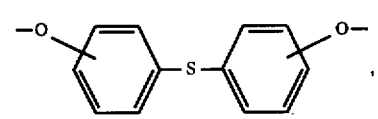

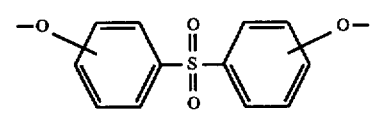

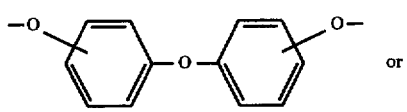 or

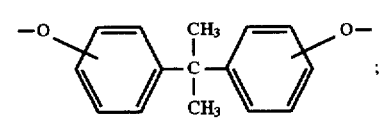

$R_3$ is an aliphatic radical preferably $-CH_3$ or $-C_2H_5$; t equals 1 to 6. In some embodiments $Ar_1$ can be a mixture of these radicals.

$Ar_2$ is a sulfonated diamine moiety having the following formulae:

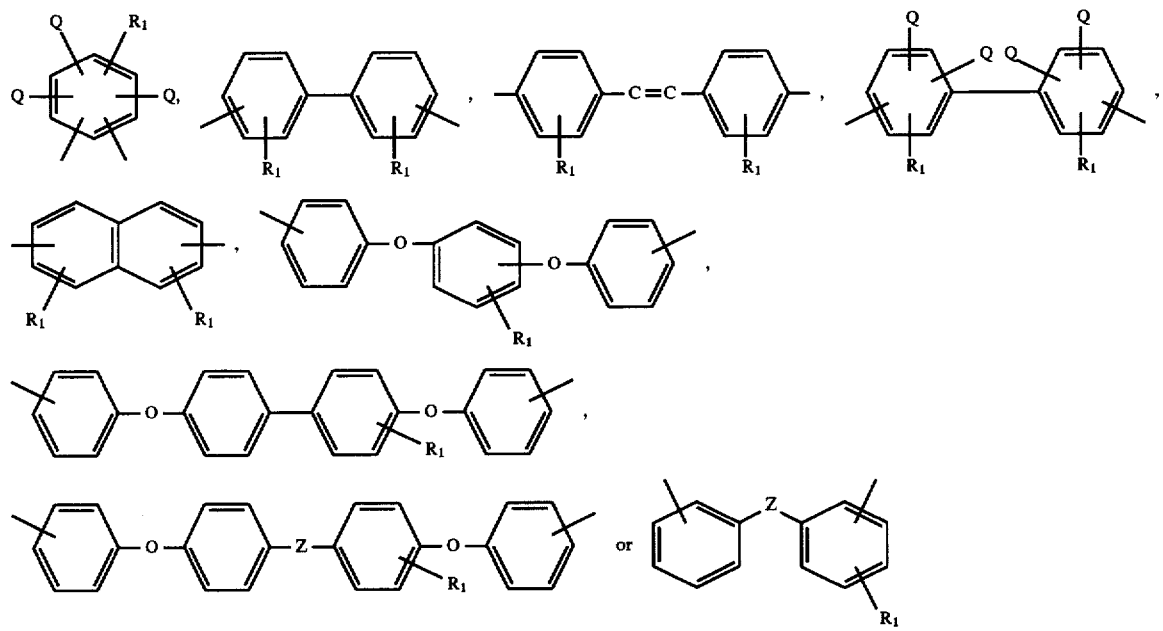
where $R_1$ is hydrogen, —$SO_3H$, —$SO_3M$ or —$SO_2OR_2$ group wherein at least one $R_1$ in the $Ar_2$ aromatic diamine moiety is —$SO_3H$, —$SO_3M$ or —$SO_2OR_2$. $R_2$, M and Z are as specified previously. Q is one of hydrogen, —$CH_3$ or —$C_2H_5$. In some embodiments $Ar_2$ can be a mixture of these radicals.
$Ar_3$ is an aromatic diamine moiety having the following formulae:
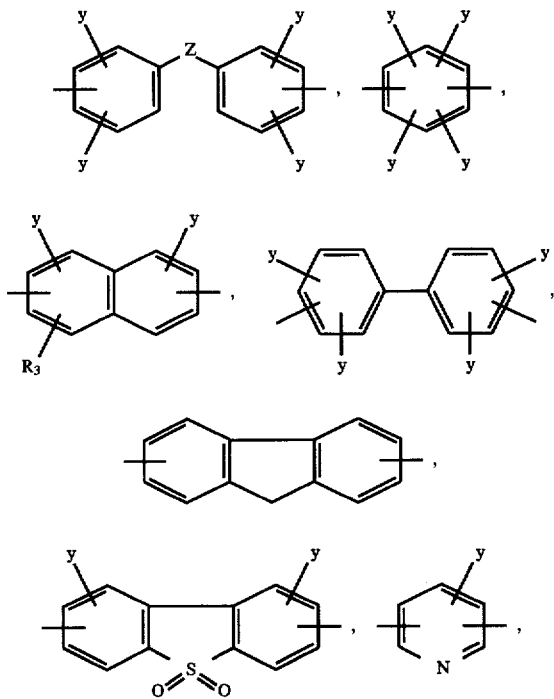
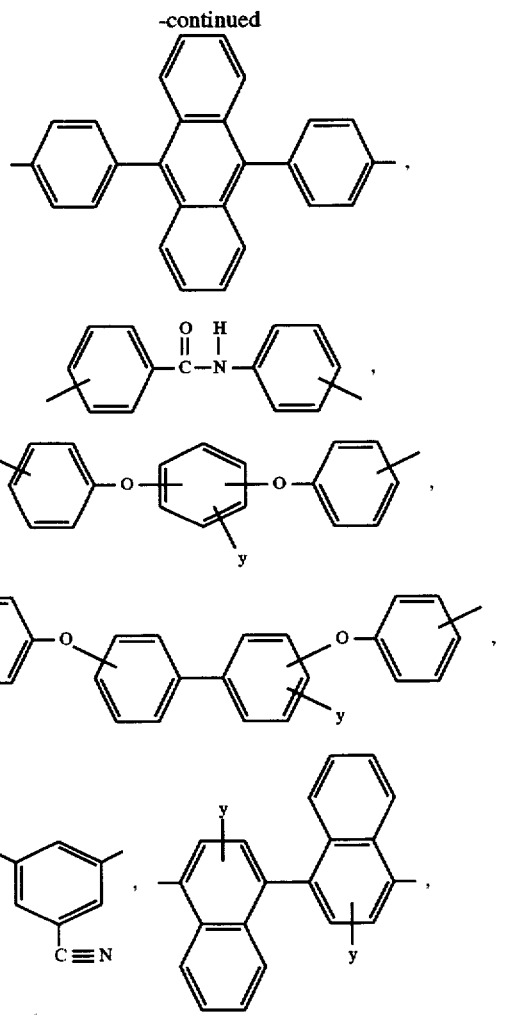

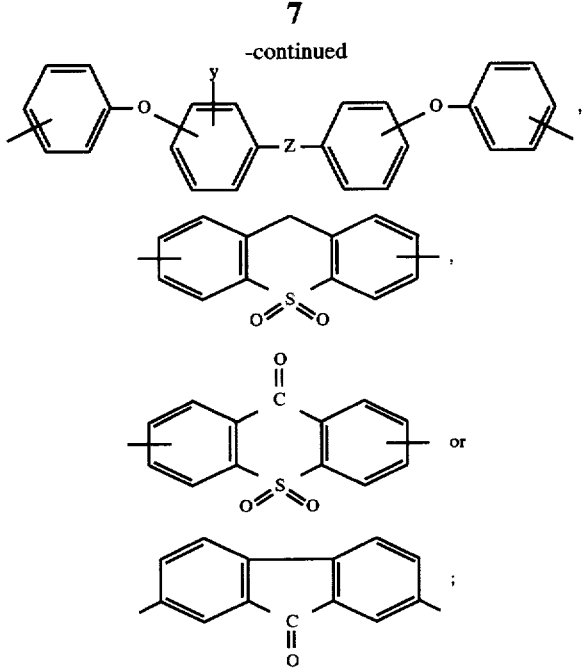

y can be independently hydrogen, CH$_3$, —C(CH$_3$)$_3$, —OCH$_3$, —CF$_3$, —F, —Cl, —Br, or —I, and z and R$_3$ are as specified previously. In some embodiments, Ar$_3$ can be a mixture of these radicals.

The sulfonated polyimides of this invention can be synthesized by methods well known in the art. The preferred method involves condensation polymerization of dianhydrides with diamines wherein one of the monomeric units contains sulfonic acid, sulfonic acid salt, or sulfonic acid ester group, preferably sulfonic acid salt or sulfonic acid ester group, most preferably lithium salt form.

Polyimides are generally prepared in a two-step process in which a dianhydride and a diamine are first reacted to prepare a polyamic acid that is subsequently converted to a polyimide in a second step. A wide variety of dianhydrides and diamines can be reacted to prepare polyimides that are suitable for use in the present invention. The suitable solvents that can be used for the reaction of a dianhydride with a diamine are disclosed in U.S. Pat. No. 3,179,634. Preferably the solvents are dimethylacetamide, N-methyl pyrrolidone, dimethylformamide or dimethylsulfoxide. The most preferred solvent is dimethyl sulfoxide. After a polyamic acid is prepared by the reaction of a diamine and a dianhydride, the polyamic acid is converted to a polyimide using thermal or chemical conversion processes. In the case of soluble polyimides, the polyamic acid is preferably chemically converted into a polyimide employing acetic anhydride in the presence of triethylamine as a catalyst. The resulting polyimide can be precipitated by a suitable solvent, recovered and dried. The sulfonated polyimides of this invention can be prepared following the above described methods from dianhydride and diamine monomers that contain sulfonic acid, sulfonic acid salt or sulfonic acid ester groups. The use of diamine monomers with sulfonic acid radicals is particularly preferred. Copolyimides containing sulfonic acid radicals can be prepared by condensation polymerization of rigid aromatic dianhydrides and a mixture of sulfonated and unsulfonated diamines. In one embodiment of this invention, the sulfonic acid moiety is selected from 4,4'-diaminostilbene-2,2'-disulfonic acid; 4,4'-diaminobiphenol-2,2'-disulfonic acid; 4,4'-diamino-3,3'-dimethylbiphenyl-6,6'-disulfonic acid; 2,4-diaminobenzene sulfonic acid or their respective salt forms or mixtures thereof, and the unsulfonated diamine is selected from 2,4,6-trimethyl-1,3-phenylenediamine; 2,6-diaminotoluene; 3,3'-diaminodiphenyl sulfone; 1,5-diamino naphthalene; 2,2-bis(4-aminophenyl) hexafluoropropane; o-tolidine sulfone or mixtures thereof and the dianhydride is 2,2-(3,4-dicarboxyphenyl) hexafluoropropane dianhydride. In one preferred embodiment of this invention, 2,2-bis(3,4-dicarboxyphenyl) hexafluoropropane dianhydride (6FDA) is reacted with two aromatic diamines: 4,4'-diaminostilbene-2,2'-disulfonic acid lithium salt, and 1,5-diaminonaphthalene.

In another preferred embodiment of this invention, 2,2-bis(3,4-dicarboxyphenyl) hexafluoropropane dianhydride (6FDA) is reacted with three diamines: the lithium salt of 4,4'-diaminostilbene-2,2'-disulfonic acid, o-tolidine sulfone (TSN) and 3,3'-diaminodiphenyl sulfone.

The solubility characteristics and the gas permeation/separation characteristics of the sulfonated polyimides of this invention can be controlled by selecting the appropriate monomers and their combination. The solubility characteristics of sulfonated polyimides depend on the concentration of the sulfonic acid groups and the nature of the counter ion. The concentration of sulfonic acid groups as measured by ion exchange capacity, IEC, can vary from as low as 0.1 meq/g to above 3 meq/g. The preferred range is from 0.5 to 3 meq/g of dry resin in H$^+$ form. The preferred counter ions are monovalent metal ions and organic monofunctional amines. The most preferred counter ion is lithium. The presence of sulfonic acid groups in high concentrations renders polyimides of this invention soluble in solvent systems such as ketones, oxyalcohols, and aliphatic alcohols, their mixtures, and their mixtures with water.

The gas permeability coefficients of polyimides frequently increase with the use of structurally rigid dianydrides and ring substituted diamines. The presence of rigid links and rotation hindering groups can increase gas permeability coefficients and gas separation factors. Introduction of sulfonic acid radicals into the polyimide structure provides bulky rotation hindering side groups and also renders the polymers more soluble. However, high concentrations of sulfonic acid groups in the polyimide backbone can decrease the gas permeability coefficient of some fast gases but can lead to an increase in the gas separation factor(s).

The gas permeability coefficients and gas separation factors of polyimides prepared according to the teachings of this invention were determined using flat-sheet films. The films were prepared by solution casting of polymers dissolved in methanol or dimethylformamide on a glass plate followed by air drying. The air-dried films were stripped from the glass plate and dried in a vacuum oven at 80 to 120C. for several days. The dried films that were 1 to 3 mils thick were sandwiched between two aluminum foils exposing a 2.54 cm diameter area, placed in a permeation cell and sealed with epoxy resin. The downstream side of the cell was evacuated up to about $2 \times 10^{-2}$ mm Hg and the permeate feed gas was introduced from the upstream side. The pressure of the permeate gas on the downstream side was measured using an MKS-Barathon pressure transducer. The permeability coefficient P was calculated from the steady-state gas permeation rate according to the equation:

$P = C \times V \times L \times dp/dt \times 1/h$
$C = $ constant
$V = $ volume of collection receiver

```
L = thickness of film
h = upstream pressure
dp/dt = slope of steady-state line
```

The permeability coefficient P is reported in Barrer units (1 Barrer=$10^{-10} \times cm^3$ cm/$cm^2$ cmHg sec). To determine the intrinsic viscosity, the reduced and inherent viscosities were measured at three different concentrations (0.40, 0.27 and 0.20 g/dl). The measurements were carried out in Ubbelohde-type viscometers at 25° C. The intrinsic viscosity of the sulfonated samples was measured in 0.05N lithium perchlorate dimethylformamide solvent mixture. The reduced viscosity was measured at 0.2 g/dl concentration in 0.05N $LiCO_4$ in DMF solution.

The sulfonated polyimide polymers of this invention are preferably formed into composite gas separation membranes. U.S. Pat. Nos. 4,602,922; 4,826,599; and 4,840,819 discuss such composite membranes and the process for their manufacture. The membranes of this invention are particularly suitable for preparation of composite gas separation membranes because the latter frequently require mild, highly volatile, e.g., low boiling temperature solvents. The preferred solvents for preparation of composite membranes are ethyl acetate, acetone, ethylene glycol monomethyl ether, alcohols or mixtures thereof.

The invention will now be further illustrated by way of the following examples, which are considered to be illustrative only and nonlimiting.

EXAMPLE 1

Preparation of a polyimide from 2,2-bis(3,4-dicarboxyphenyl) hexafluoropropane dianhydride (6FDA) and 4,4'-diaminostilbene-2,2'-disulfonic acid lithium salt is as follows: 12.9 gms (0.0338 moles) of 4,4'-diaminostilbene-2,2'-disulfonic acid lithium salt were dissolved in 87 ml of dimethylsulfoxide (dried over and distilled from sodium hydroxide pellets under reduced pressure and stored over 4A molecular sieves prior to use) at room temperature under dry argon atmosphere. The solution was cooled to 20° C. and 15.3 gms (0.0338 moles) of 6FDA were added in 3 gms portions over a period of about half an hour. During the addition the reaction mixture was stirred and the temperature was kept around 20° C. After the addition of 6FDA was completed, a very viscous solution was obtained. 200 ml of DMSO were added to reduce the viscosity. The solution was cooled to 20° C. and 30 ml of freshly distilled acetic anhydride were added dropwise followed by the addition of 4.9 ml of freshly distilled triethylamine. The solution was stirred for 28 hours at room temperature and 100 ml of acetone were added with vigorous stirring to precipitate the product. The precipitated polymer was filtered and washed with acetone. The polymer was first dried at room temperature followed by drying at 170° C. in a vacuum oven to constant weight. The intrinsic viscosity of thus prepared polyimide was 1.10 dl/g.

EXAMPLE 2

The preparation of a polyimide from 2,2-bis(3,4-dicarboxyphenyl) hexafluoropropane dianhydride (6FDA) and 4,4'-diaminobiphenyl-2,2'-disulfonic acid lithium salt is in general accordance with the procedure outlined in Example 1. The polyimide was prepared using the following materials: 12.0 gm (0.0338 mole) 4,4'-diaminobiphenyl-2,2'-disulfonic acid lithium salt; 15.3 gm (0.0338 mole) 6FDA; 87 ml dimethylsulfoxide (processed as explained in Example 1). Intrinsic viscosity of this polyimide was 0.63 dl/g.

EXAMPLE 3

Preparation of a copolyimide from 2,2-bis(3,4-dicarboxyphenyl) hexafluoropropane dianhydride (6FDA) and a mixture of 4,4'-diaminostilbene-2,2'-disulfonic acid lithium salt and 2,4,6-trimethyl 1,3-phenylene-diamine (50/50 ratio) is as follows: 6.46 gms (0.0169 moles) of 4,4'-diaminostilbene-2,2'-disulfonic acid lithium salt and 2.54 gms (0.0169 moles) of 2,4,6-trimethyl 1,3-phenylenediamine were dissolved in 180 ml of dimethylsulfoxide (processed as described in Example 1). The solution was cooled to 20° C. and 15.3 gms (0.0338 moles) of 6FDA were added in 3 gms portions over a period of about half an hour. During addition the reaction mixture was agitated and the temperature was kept around 20° C. After the addition was completed, the solution was stirred for two days at room temperature. 30 ml of freshly distilled acetic anhydride were added dropwise to the reaction mixture followed by the addition of 4.9 ml of freshly distilled triethylamine. The solution was stirred for 28 hours at room temperature and the polymer was precipitated into toluene/methylethylketone (5/1) mixture. The polymer was recovered and redissolved in methanol. The final product was recovered by rotary evaporation. The intrinsic viscosity of this copolyimide was 0.36 dl/g.

EXAMPLE 4

The preparation of a copolyimide from 2,2-bis(3,4-dicarboxyphenyl) hexafluoropropane dianhydride (6FDA) and a mixture of 4,4'-diaminostilbene-2,2'-disulfonic acid lithium salt and 2,6-diaminotoluene (50/50 ratio) is in general accordance with the procedure outlined in Example 3. The copolyimide was prepared using the following materials: 6.46 gms (0.0169 moles) of 4,4'-diaminostilbene-2,2'-disulfonic acid lithium salt; 2.06 gms (0.0169 moles) of 2,6-diaminotoluene; 15.3 gms (0.0338 moles) of 6FDA; 160 ml dimethylsulfoxide. The intrinsic viscosity of this polyimide was 0.48 dl/g.

EXAMPLE 5

The preparation of a copolyimide from 2,2-bis(3,4-dicarboxyphenyl) hexafluoropropane dianhydride 6FDA) and a mixture of 4,4'-diaminobiphenyl-2,2'-disulfonic acid lithium salt and 2,4,6-trimethyl-1,3-phenylenediamine (50/50 ratio) is in general accordance with the procedure outlined in Example 3. The copolyimide was prepared using the following materials: 6.02 gms (0.0169 moles) of 4,4'-diaminobiphenyl 2,2'-disulfonic acid lithium salt; 2.54 gms (0.0169 moles) of 2,4,6-trimethyl-1,3-phenylenediamine; 15.3 gms (0.0338 moles) of 6FDA; 95 ml dimethylsulfoxide. The intrinsic viscosity of this copolyimide was 0.38 dl/g.

EXAMPLE 6

The copolyimide was prepared from 2,2-bis(3,4-dicarboxyphenyl) hexafluoropropane dianhydride (6FDA) and a mixture of three diamines: 3,3'-diaminodiphenylsulfone (DDS); 1,5 diaminonaphthalene; and 4,4'-diaminostilbene-2,2'-disulfonic acid lithium salt (mole ratio 30:50:20).

12.23 gms (0.032 moles) of 4,4'-diaminostilbene-2,2'-disulfonic acid lithium salt; 12.66 (0.08 moles) of 1,5-diaminonaphthalene, and 11.92 gms. (0.048 moles) of 3,3' diaminodiphenyl sulfone were dissolved in 262 ml of anhydrous dimethylsulfoxide in a reaction flask equipped with a mechanical stirrer, thermometer, and a nitrogen inlet and outlet. After the diamines were dissolved in the solvent, 71.08 gms (0.16 moles) of 6FDA were added to the diamine mixture over a period of 30 minutes under $N_2$. The temperature of the mixture was maintained below 30° C. 200 ml. of dimethylsulfoxide were then added in order to decrease the viscosity of the solution, and the reaction mixture was stirred for 24 hours at ambient temperature. After the polymerization was completed, 142 ml of freshly distilled acetic anhydride were added to the above mixture dropwise followed by 23 ml of freshly distilled triethylamine. The reaction mixture was stirred for 24 hours at ambient temperature before the polyimide was precipitated by the addition of methanol. The polymer was filtered and dried in a vacuum oven at room temperature for 1 day, at 80° C. for 3 days and finally at 120° C. for two more days. The thus prepared copolyimide had a reduced viscosity of 0.33 dl/g.

EXAMPLE 7

The copolyimide was prepared from 2,2-bis(3,4-dicarboxyphenyl) hexafluoropropane dianhydride (6FDA) and a mixture of three diamines: 3,3'-diaminophenyl sulfone (DDS); 1,5-diaminonaphthalene; and 4,4'-diaminobiphenyl-2,2'-disulfonic acid (mole ratio 30:50:20).

The copolyimide was prepared in general accordance with the procedure outlined in example 6 using the following materials: 71.08 gms (0.16 moles) of 6FDA; 12.66 gms (0.08 moles) of 1,5-diaminonaphthalene; 11.92 gms (0.048 moles) of 3,3'-diaminodiphenyl sulfone; and 11.40 gms (0.032 moles) of 4,4'-diaminobiphenyl-2,2'-disulfonic acid lithium salt. The thus prepared copolyimide had a reduced viscosity of 0.67 dl/g.

EXAMPLE 8

The copolyimide was prepared from 2,2-bis(3,4-dicarboxyphenyl) hexafluoropropane dianhydride (6FDA) and a mixture of three diamines: 1,5-diaminonaphthalene; 2,4,6-trimethyl-1,3-phenylenediamine; and 4,4'-diaminobiphenyl-2,2'-disulfonic acid (mole ratio 20:60:20).

The copolyimide was prepared in general accordance with the procedure outlined in example 6 using the following materials: 71.08 gms (0.16 moles) of 6FDA; 5.06 gms (0.032 moles) of 1,5-diaminonaphthalene; 14.42 gms (0.096 moles) 2,4,6-trimethylphenylenediamine; and 11.40 gms (0.032 moles) of 4,4'-diaminobiphenyl-2,2'-disulfonic acid lithium salt. The thus prepared copolyimide had a reduced viscosity of 0.25 dl/g.

EXAMPLE 9

The copolyimide was prepared from 2,2-bis(3,4-dicarboxyphenyl) hexafluoropropane dianhydride (6FDA) and a mixture of two diamines: 2,2-bis(4-aminophenyl) hexafluoropropane; and 4,4'-diaminobiphenyl-2,2'-disulfonic acid (mole ratio 95:5).

The copolyimide was prepared in general accordance with the procedure outlined in example 6 using the following materials: 22.9 gms (0.0516 moles) of 6FDA; 16.42 gms (0.049 moles) of 2,2-bis(4-aminophenyl)hexafluoropropane and 0.919 gms (0.0026) moles of 4,4'-diaminobiphenyl-2,2'-disulfonic acid lithium salt. The thus prepared copolyimide had a reduced viscosity of 0.42 dl/g.

EXAMPLE 10

The copolyimide was prepared from 2,2-bis(3,4-dicarboxyphenyl) hexafluoropropane dianhydride (6FDA) and a mixture of three diamines: 3,3'-diaminodiphenyl sulfone; o-tolidine sulfone; and 4,4'-diaminobiphenyl-2,2'-disulfonic acid (mole ratio 50:30:20).

The copolyimide was prepared in general accordance with the procedure outlined in example 6 using the following materials: 71.08 gms (0.16 moles) of 6FDA; 19.86 gms (0.08 moles) 3,3'-diaminodiphenyl 13.7 gms (0.048 moles) 0-tolidine sulfone; and 11.40 gms (0.032 moles) of 4,4'-diaminobiphenyl-2,2'-disulfonic acid lithium salt. The thus prepared copolyimide had a reduced viscosity of 0.36 dl/g.

The gas permeability coefficients and gas separation factors of the sulfonated polyimides of the invention, as prepared in examples 1 through 10, are summarized in Table 1.

TABLE 1

| Polymer Example No. | $IV^{(1)}$ or $RV^{(4,5)}$ (d/g) | $IEC^{(2)}$ | Permeability Coefficient[3] | | | | | Separation Factor | | |
|---|---|---|---|---|---|---|---|---|---|---|
| | | | PHe | $PO_2$ | $PN_2$ | $PCH_4$ | $PCO_2$ | $O_2/N_2$ | $He/N_2$ | $CO_2/CH_4$ |
| 1 | 1.1[1] | 2.53 | 4.16 | 0.06 | 0.01 | — | — | 11 | 830 | — |
| 2 | 0.63[1] | 2.62 | 6.07 | 0.11 | 0.01 | — | — | 8.4 | 480 | — |
| 3 | 0.36[1] | 1.48 | 42.8 | 2.66 | 0.41 | 0.16 | 11.4 | 6.4 | 103 | 70 |
| 4 | 0.48[1] | 1.51 | 25.6 | 1.04 | 0.15 | 0.05 | 4.63 | 7.1 | 176 | 96 |
| 5 | 0.38[1] | 1.54 | 56.1 | 4.2 | 0.75 | 0.28 | 18.8 | 5.6 | 75 | 66 |
| 6 | 0.33[4] | 0.63 | 39 | 2.15 | 0.3 | 0.11 | 8.78 | 7.1 | 128 | 81 |
| 7 | 0.67[4] | 0.63 | 37 | 2.3 | 0.34 | 0.14 | 9.39 | 6.8 | 110 | 65 |
| 8 | 0.25[4] | 0.66 | 146 | 21.9 | 4.53 | 2.58 | 95.5 | 4.8 | 32 | 37 |
| 9 | 0.42[5] | 0.13 | 90.5 | 10.7 | 2.22 | 1.06 | 46.4 | 4.8 | 41 | 44 |
| 10[1] | 0.36[4] | 0.62 | 32.4 | 1.57 | 0.22 | 0.09 | 6.52 | 7 | 145 | 74 |

[1] Intrinsic viscosity dl/g, measured in 0.05 N $LiCLO_4$ in DMF solution at 25° C.
[2] IEC, ion exchange capacity, meq/gram of dry polymer.
[3] In Barrer units, measured at 30° C.
[4] Reduced viscosity measured in 0.2 g/dl concentration in 0.05 N $LiCO_4$ in DMF solution at 25° C.
[5] Reduced viscosity measured in 0.2 g/dl concentration in $CH_2Cl_2$

What is claimed is:

1. A process for separating one or more gases from a mixture of gases comprising the steps of bringing said gaseous mixture into contact with a first side of a gas separation membrane such that a portion of said gas mixture permeates to a second side of said membrane and a portion of said gas mixture is collected as a nonpermeate, the resulting gas mixture on said second side of said membrane being enriched in one or more components over that of the mixture on the first side of said membrane, wherein said gas separation membrane is formed from a sulfonated polyimide comprising repeating units of the formula:
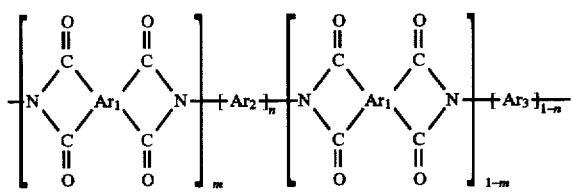
wherein:
is selected from the group consisting of:
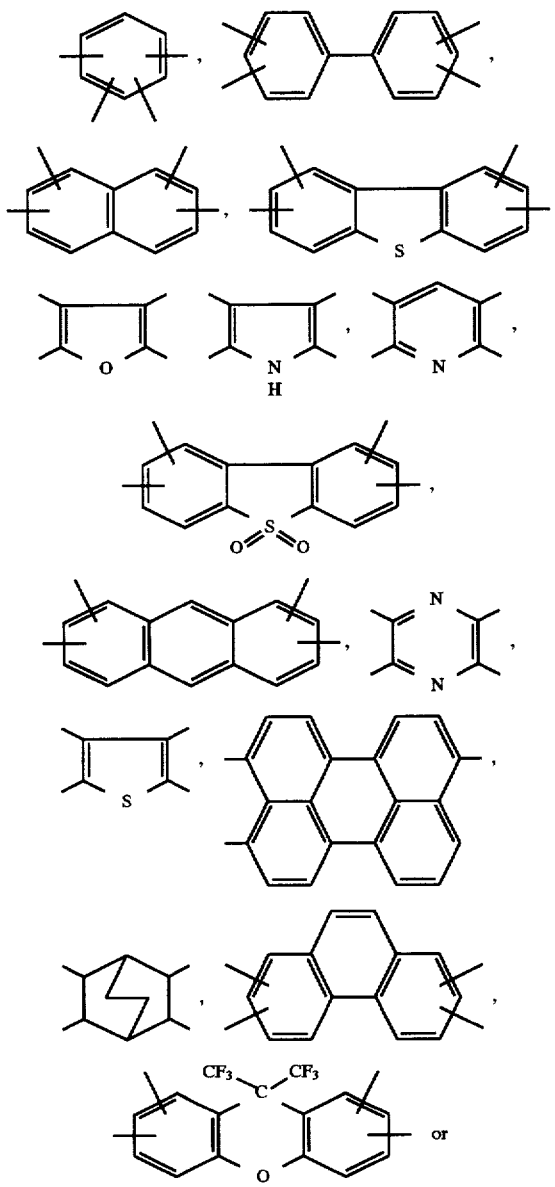
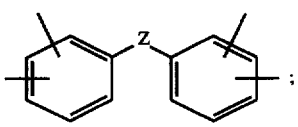
or mixtures thereof;
—Ar$_2$— is an aromatic sulfonated diamine moiety selected from the group consisting of:
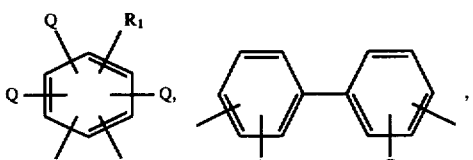
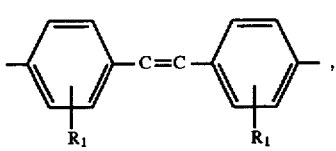
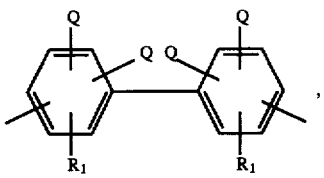
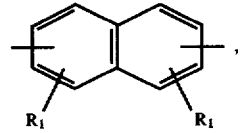
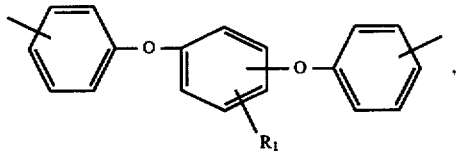
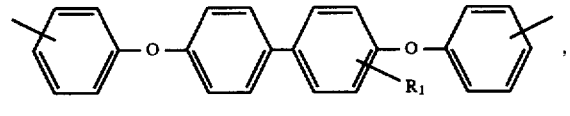
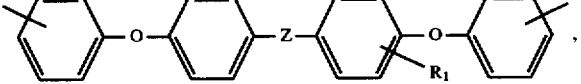
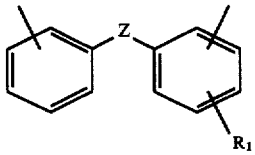
or mixtures thereof;
—Ar$_3$— is an aromatic diamine moiety selected from the group consisting of:

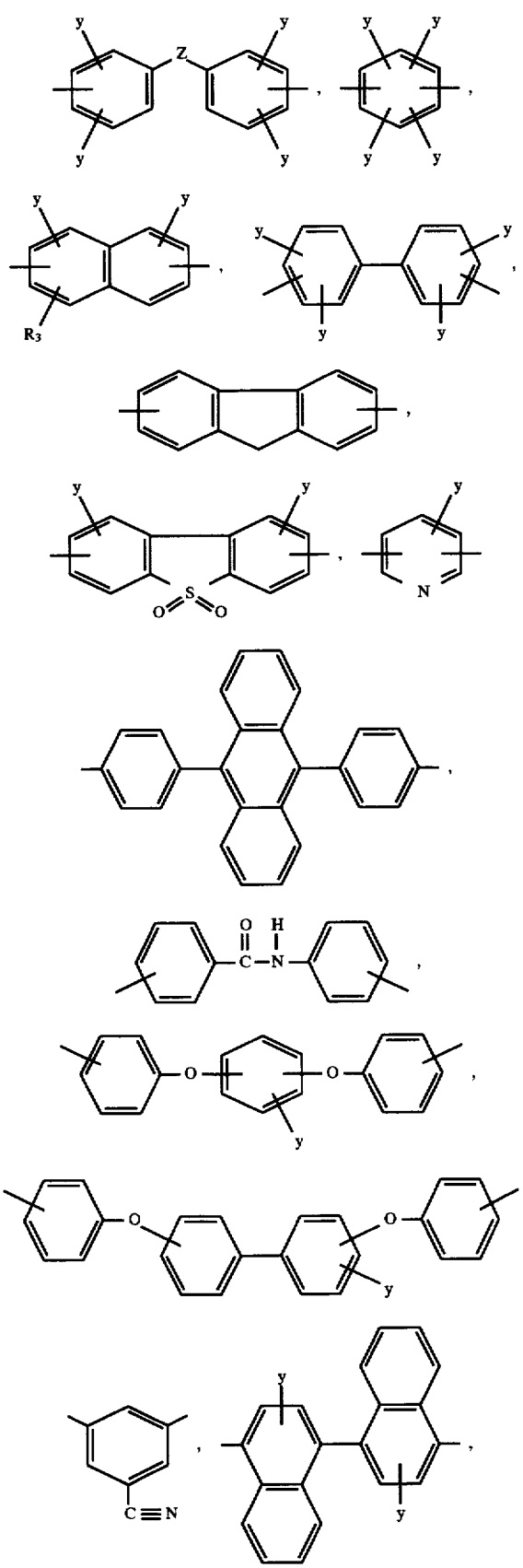

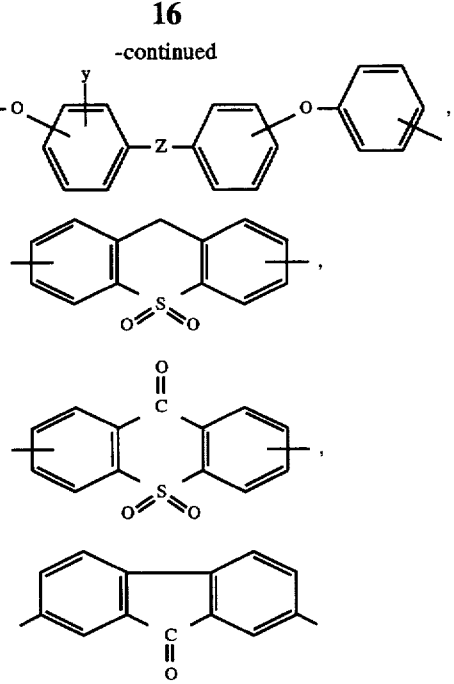

or mixtures thereof;

$R_1$ is hydrogen, —$SO_3H$, —$SO_3M$ or —$SO_2OR_2$, wherein at least one $R_1$ in the $Ar_2$ aromatic diamine moiety is —$SO_3H$, —$SO_3M$ or —$SO_2OR_2$;

$R_2$ is either an aryl radical or an alkyl radical with less than 6 carbon atoms;

M is an organic base, ammonium ion, alkali metal ion, alkali-earth metal ion, or transitional metal ion;

Q is one of hydrogen, —$CH_3$ or —$C_2H_5$ when $Ar_2$ is

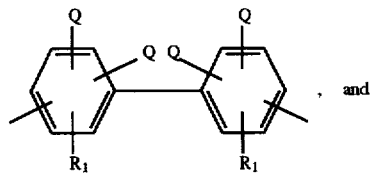, and

Q is one of —$CH_3$ or —$C_2H_5$ when $Ar_2$ is

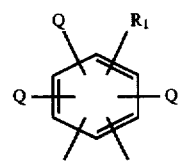

Y is selected from the group consisting of hydrogen, —$CH_3$, —$C(CH_3)_3$, —$CF_3$, —F, —Cl, —Br, or —I;

Z is selected from the group consisting of:

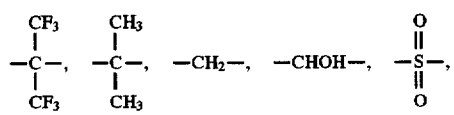

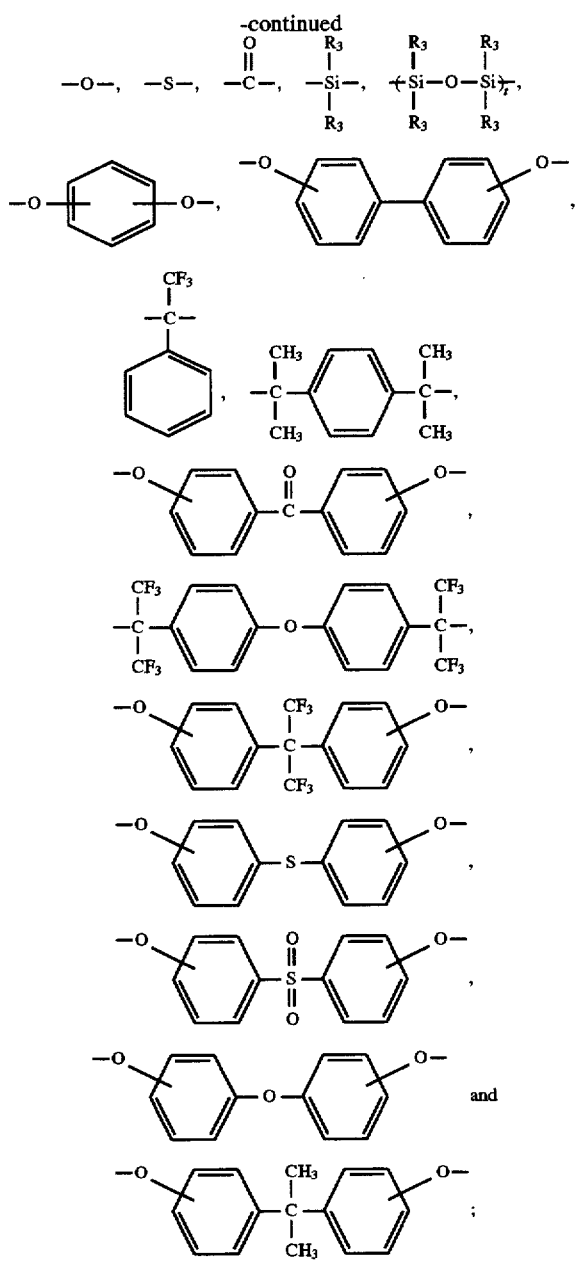

R₃ is an aliphatic radical;
t equals 1 to 6;
n is a fraction from 0.01 to 1 and
m is a fraction from 0 to 1.0.

2. The process of claim 1 wherein Ar₂ is selected from the group consisting of: 4,4'-diaminostilbene-2,2'-disulfonic acid, 4,4'-diaminobiphenyl-2,2'-disulfonic acid, 4,4'-diamino-3,3'-dimethylbiphenyl-6,6'-disulfonic acid, 2,4-diaminobenzene sulfonic acid, their respective salt forms or mixtures thereof.

3. The process of claim 2 wherein Ar₃ is selected from the group consisting of 2,4,6-trimethyl-1,3-phenylenediamine, 2,6-diaminotoluene, 3,3'-diaminodiphenyl sulfone, 1,5-diaminonaphthalene, 2,2-bis (4-aminophenyl) hexafluoropropane, o-tolidine sulfone, or mixtures thereof.

4. The process of claim 1 wherein n is a fraction from 0.1 to 0.7 and m is a fraction from 0.5 to 1.0.

5. The process of claim 4 wherein Ar₁ is 2,2-(3,4-dicarboxyphenyl) hexafluoropropane dianhydride.

6. The process of claim 5 wherein Ar₂ is 4,4'-diaminostilbene-2,2'-disulfonic acid lithium salt and Ar₃ is 1,5-diaminonaphthalene.

7. The process of claim 6 wherein M is a lithium ion.

8. The process according to claim 1, wherein R₂ is either a methyl or ethyl radical.

9. The process of claim 1, wherein R₃ is either —CH₃ or —C₂H₅.

10. The process of claim 1 wherein said membrane is a composite gas separation membrane.

11. The process of claim 10 wherein the said composite membrane was prepared by coating a porous substrate with a sulfonated polyimide dissolved in a solvent selected from the group consisting of: ethyl acetate, ethylene glycol monomethyl ether, methyl alcohol, ethyl alcohol, isopropanol or mixtures thereof.

12. The process of claim 1 wherein said membrane is an asymmetric gas separation membrane.

13. The process of claim 1 wherein said membrane is a hollow fiber membrane.

14. The process of claim 1 wherein M is a lithium ion.

15. The process of claim 1 wherein said sulfonated polyimide was prepared by a method comprising:

(a) dissolving a mixture of sulfonated and unsulfonated aromatic diamines in a polar solvent;

(b) adding dianhydride to the reaction mixture;

(c) forming polyamic acid via polycondensation reaction;

(d) chemically converting said polyamic acid into sulfonated polyimide; and (e) recovering said sulfonated polyimide.

16. The process of claim 15 wherein said polar solvent is dimethylsulfoxide.

17. The process of claim 1 wherein said gas mixture comprises at least one of CO₂ or H₂S.

18. A sulfonated polyimide comprising repeating units of the formula:

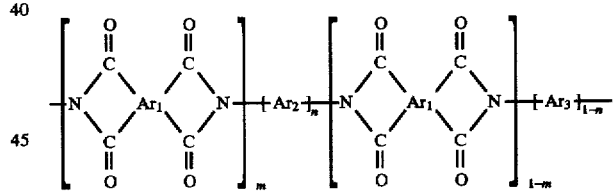

wherein:

is selected from the group consisting of:

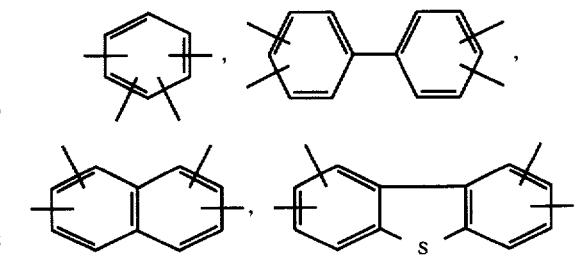

or mixtures thereof;

—Ar$_2$— is an aromatic sulfonated diamine moiety selected from the group consisting of:

or mixtures thereof;

—Ar$_3$— is an aromatic diamine moiety selected from the group consisting of:

-continued

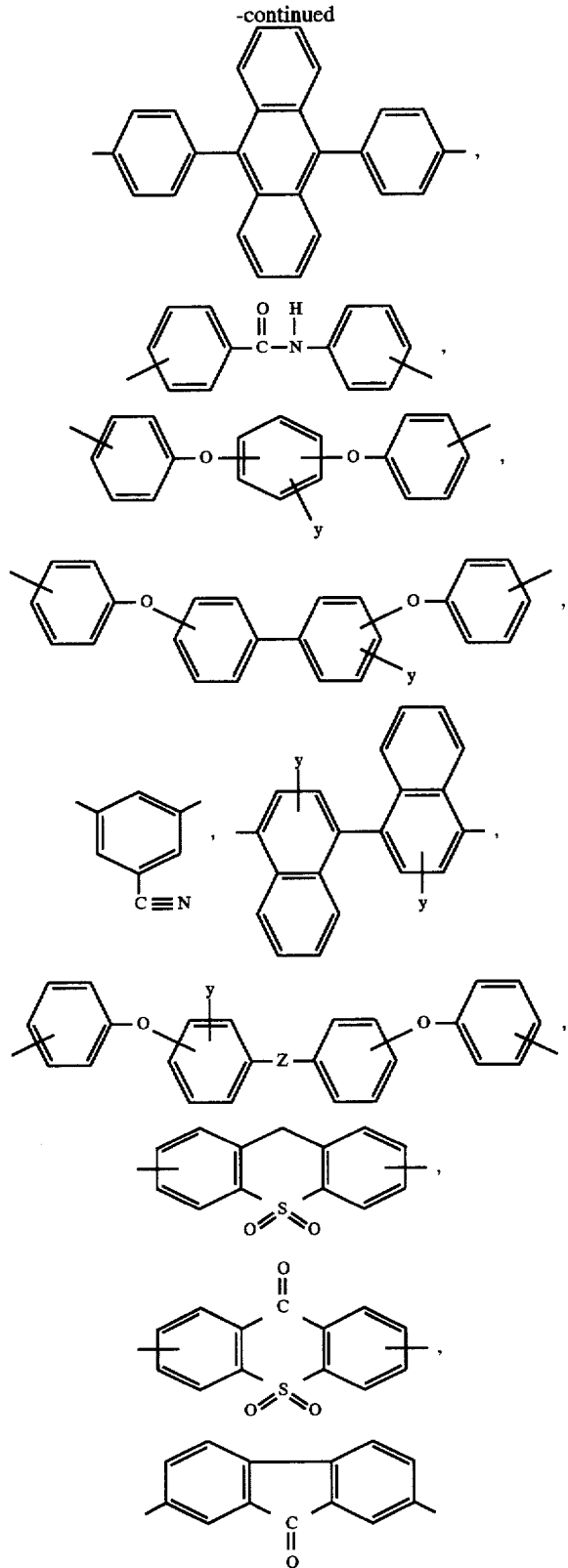

or mixtures thereof;

$R_1$ is hydrogen, —SO$_3$H, —SO$_3$M or —SO$_2$OR$_2$, wherein at least one $R_1$ in the Ar$_2$ aromatic diamine moiety is —SO$_3$H, —SO$_3$M or —SO$_2$OR$_2$;

$R_2$ is either an aryl radical or an alkyl radical with less than 6 carbon atoms;

M is an organic base, ammonium ion, alkali metal ion, alkali-earth metal ion, or transitional metal ion;

Q is one of hydrogen, —CH$_3$ or —C$_2$H$_5$ when Ar$_2$ is

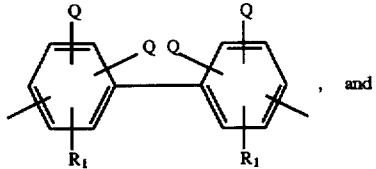, and

Q is one of —CH$_3$ or —C$_2$H$_5$ when Ar$_2$ is

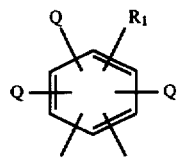

Y is selected from the group consisting of hydrogen, —CH$_3$, —C(CH$_3$)$_3$, —CF$_3$, —F, —Cl, —Br, or —I;

Z is selected from the group consisting of:

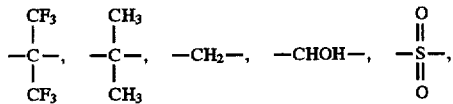

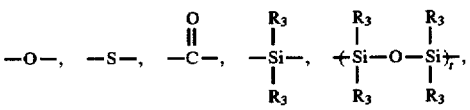

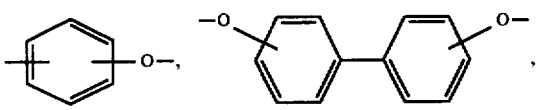

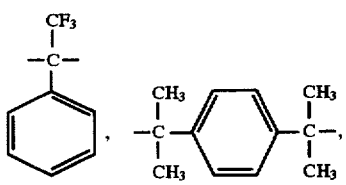

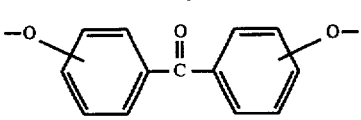

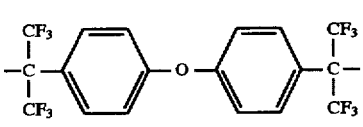

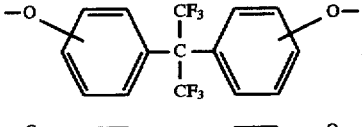

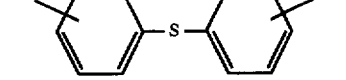

-continued

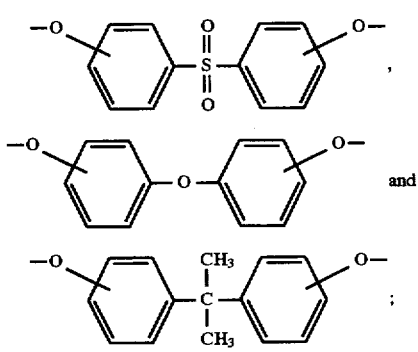

$R_3$ is an aliphatic radical;
t equals 1 to 6;
n is a fraction from 0.01 to 1 and
m is a fraction from 0 to 1.0.

19. The sulfonated polyimide of claim 18 wherein $Ar_2$ is selected from the group consisting of: 4,4'-diaminostilbene-2,2'-disulfonic acid, 4,4'-diaminobiphenyl-2,2'-disulfonic acid, 4,4'-diamino-3,3'-dimethylbiphenyl-6,6'-disulfonic acid, 2,4-diaminobenzene sulfonic acid, their respective salt forms or mixtures thereof.

20. The sulfonated polyimide of claim 19 wherein $Ar_3$ is selected from the group consisting of 2,4,6-trimethyl-1,3-phenylenediamine, 2,6-diaminotoluene, 3,3'-diaminodiphenyl sulfone, 1,5-diaminonaphthalene, 2,2-bis (4-aminophenyl) hexafluoropropane, o-tolidine sulfone, or mixtures thereof.

21. The sulfonated polyimide of claim 18 wherein $Ar_1$ is 2,2-(3,4-dicarboxyphenyl) hexafluoropropane dianhydride.

* * * * *